US008489651B2

(12) United States Patent
Pawar et al.

(10) Patent No.: US 8,489,651 B2
(45) Date of Patent: Jul. 16, 2013

(54) RECONSTRUCTION OF GARBAGE COLLECTION INFORMATION

(75) Inventors: Kshama Shivaji Pawar, Redmond, WA (US); Mihai E. Stoicescu, Redmond, WA (US); Igor A. Murashkin, Mountain View, CA (US); Kevin B. Frei, Bellevue, WA (US); B. Scott Wadsworth, Woodinville, WA (US); Grant A. Richins, Redmond, WA (US); Michael B. Green, Bellevue, WA (US); Craig A. Vinet, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 13/072,509

(22) Filed: Mar. 25, 2011

(65) Prior Publication Data

US 2012/0246203 A1    Sep. 27, 2012

(51) Int. Cl.
*G06F 12/00* (2006.01)

(52) U.S. Cl.
USPC ............................. 707/813; 707/814; 707/819

(58) Field of Classification Search
None
See application file for complete search history.

(56) References Cited

U.S. PATENT DOCUMENTS

| 6,065,020 A | 5/2000 | Dussud |
| 6,629,113 B1 | 9/2003 | Lawrence |
| 7,404,182 B1 * | 7/2008 | Garthwaite et al. .......... 717/140 |
| 7,529,786 B2 | 5/2009 | Andreasson |
| 2001/0013117 A1 * | 8/2001 | Ungar .............................. 717/5 |
| 2005/0222979 A1 | 10/2005 | Wu et al. |
| 2007/0016633 A1 | 1/2007 | Lindholm et al. |
| 2007/0033240 A1 | 2/2007 | Barsness et al. |
| 2008/0172431 A1 | 7/2008 | Stephens et al. |
| 2010/0011357 A1 | 1/2010 | Ramamurthy |

OTHER PUBLICATIONS

Shail Aditya, et al., Garbage Collection for Strongly-Typed Languages using Run-time Type Reconstruction, Mar. 20, 1994, (13 pages).

* cited by examiner

*Primary Examiner* — Fred I Ehichioya
*Assistant Examiner* — Hasanul Mobin
(74) *Attorney, Agent, or Firm* — Workman Nydegger

(57) ABSTRACT

The reconstruction of garbage collection information corresponding to an application. Upon accessing a portion of compiler generated application code, a computing system generates computational results that identifies one or more program state storage locations that track live references or memory pointers that can be displaced during garbage collection. This may be performed for multiple application code portions (such as methods or functions of an application), and may be performed just before garbage collection. To generate the computational results, the application code portion may first be subjected to a liveness analysis to generate liveness analysis results in the form of one or more live program state storage locations in the application code portion. The computational results may then be generated using the liveness analysis results and type information from a type service to provide the set of storage locations referencing live memory objects.

16 Claims, 3 Drawing Sheets

RECONSTRUCTION OF GARBAGE COLLECTION INFORMATION

BACKGROUND

As an application executes on a computing system, when data of a particular type is to be utilized by the application, the application will cause the operating system to allocate memory that is of sufficient size and structure for the data of that type. Ideally, when the application is done with the data, the program can cause the operating system to release the memory. However, the application itself often does not release the memory. Over time, this results in a large quantity of the memory being allocated for data that is not going to be used further by the application.

In order to avoid this unwanted accumulation in memory being allocated to unused data (called "dead memory"), various background garbage collection applications may seek out such dead memory, and release the memory for further use by the operating system. In order to assist garbage collection applications, during compilation of a subject application that is to allocate memory, the compiler will generate garbage collection information representing dead memory locations that the subject application has failed to release after the corresponding data is no longer to be used.

BRIEF SUMMARY

At least one embodiment described herein relates to the reconstruction of garbage collection information corresponding to an application. The garbage collection information may be used to perform garbage collection on computer memory and/or storage locations. Upon accessing a portion of compiler generated application code, a computing system generates computational results that identifies one or more storage locations that track live reference or memory pointers that can be displaced during garbage collection. This may be performed for multiple application code portions (such as methods or functions of an application), and may be performed just before garbage collection.

In one embodiment, to generate the computational results, the application code portion is subjected to a liveness analysis to generate liveness analysis results in the form of one or more live storage locations in the application code portion. The computational results may then be generated using the liveness analysis results and type information from a type service. That type information may have been acquired from a compiler during the compilation of the application and/or perhaps by analyzing metadata in the source code of the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, garbage collection information corresponding to an application is reconstructed after compile time. Upon accessing a portion of compiler generated application code, a computing system generates computational results that identify one or more storage locations that track live reference or memory pointers that can be displaced during garbage collection. This may be performed for multiple application code portions (such as methods or functions of an application), and may be performed just before garbage collection. When performed just before garbage collection at runtime, the reconstructed garbage collection information may use considerably less memory than garbage collection information that is generated by the compiler. The reconstructed garbage collection information may also be used to validate compiler-generated garbage collection information. First, some introductory discussion regarding computing systems will be described with respect to FIG. 1. Then, the embodiments of the reconstruction of garbage collection information will be described with respect to FIGS. 2 and 3.

Figure 1:
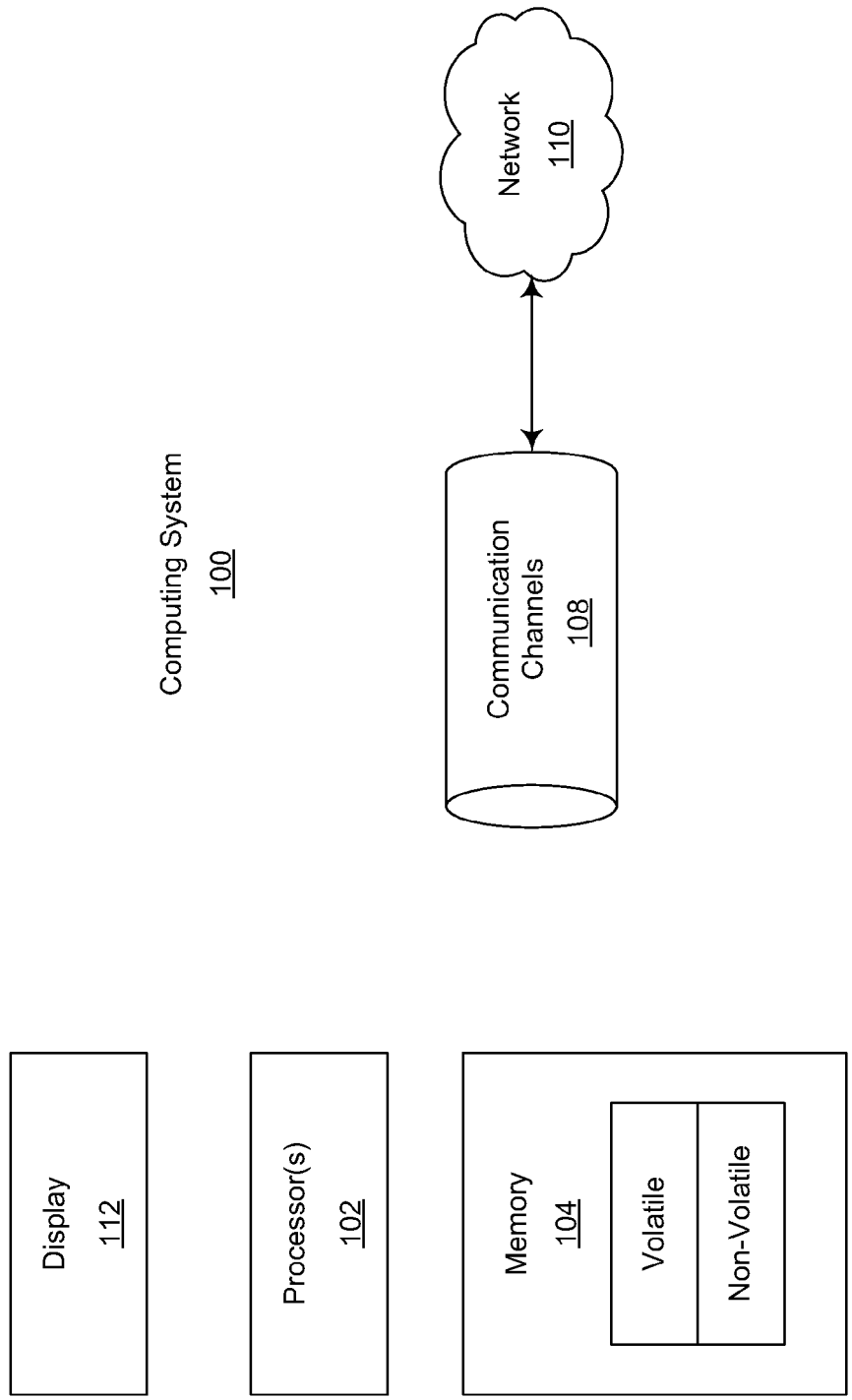
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors 102 of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a Network Interface Card or "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
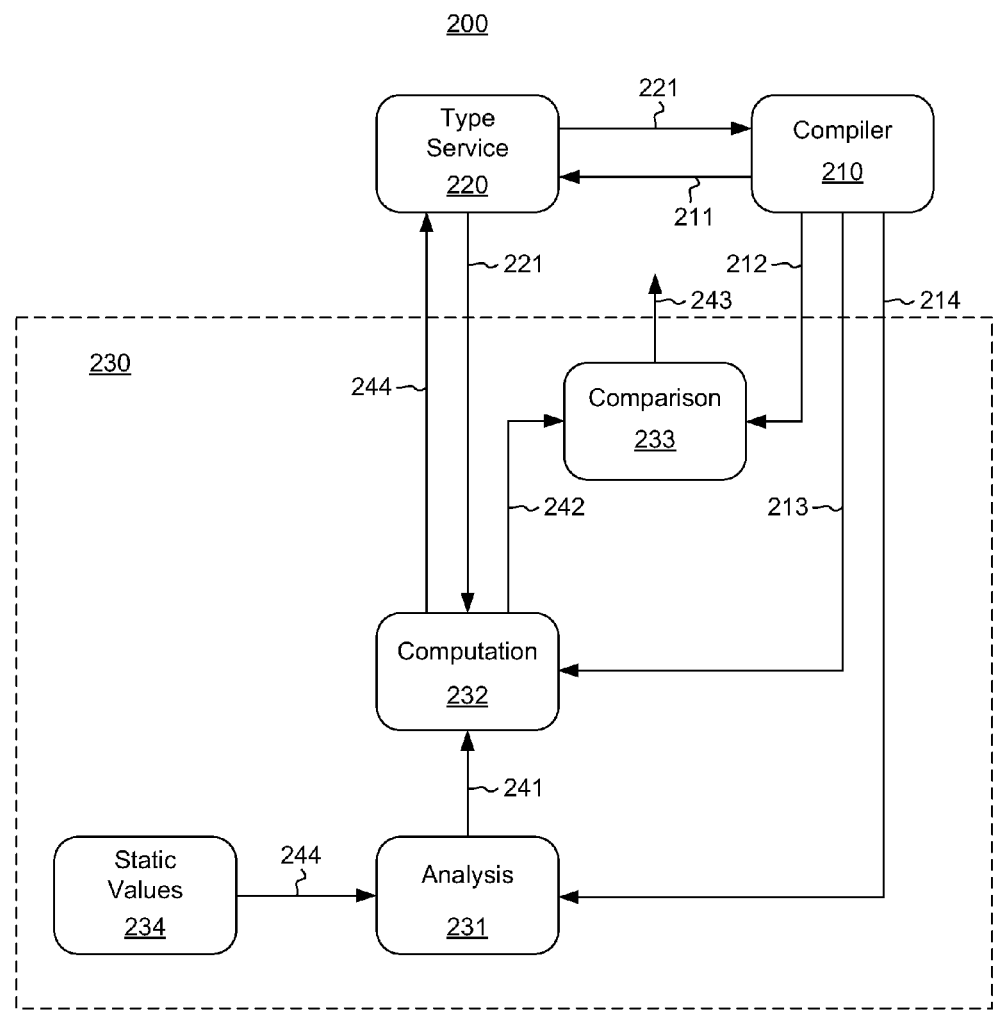
FIG. 2 illustrates a simplified architectural process flow that may be used to reconstruct garbage collection information used to perform garbage collection on computer memory and/or storage locations.

FIG. 2 illustrates a simplified architectural process flow 200 that may be used consistent with the principles described herein. The process flow 200 includes a compiler 210, a type service 220 and a reconstruction environment 230. During compilation time, a compiler 210 generates compiled code and other information. The compiled code could be intermediate code, binary code, or assembly code. The other information generated by the compiler during compile time might include, for example, 1) pinning information against storage locations that indicates which storage locations should not be moved, 2) prolog and epilog start/end offsets that may be used to help identify storage locations, 3) exception handling control flow in the compiler-generated code to construct an accurate control flow graph of the assembly code, and 4) signatures and return types of calls within the code. In one embodiment, compiled code and other information is stored for multiple portions of the compiled application. For instance, the compiled code and other compiler-generated information might be generated for each method or function within the application and made available to the reconstruction environment 230 one method at a time.

The compiler 210 need not be actually present within the flow environment 200 at the time the garbage collection information is reconstructed using the reconstruction environment 230. However, the compiled code and other information are made available to the reconstruction environment 230 to facilitate reconstruction. The reconstruction environment 230 may, for example, be formulated in the memory of a computing system (such as the computing system 100 of FIG. 1) in response to the computing system executing one or more computer-executable instructions that are structured on computer-readable media of a computer program product. As the method 300 of FIG. 3 may be performed by the reconstruction environment 230 of FIG. 2, the method 300 may also be performed by the computing system in response to executing such computer-executable instructions.

The type service 220 may have acquired type information regarding the application by using metadata in the source code of the application. During compilation, the type service 220 interacts with the compiler 210 (as represented by arrows 211 and 221). Alternatively or in addition to acquiring type information by analyzing the source code, the type service 220 might also acquire type information by interacting with the compiler 210 during compilation. The reconstruction environment 230 later queries the type service 220 for type information in order to reconstruct garbage collection information. The type service 220 may, for example, provide information such as 1) signature and return type of the application code (e.g., method) under consideration, 2) identification of object types during allocation calls and locals construction, 3) type identification of fields of allocated objects or incoming arguments, 4) array usage information (such as length, bound, item types), and 5) type identification of static fields.

The operation and further structure of the reconstruction environment 230 of FIG. 2 will now be described with respect to FIG. 3, which illustrates a flowchart of a method 300 for reconstructing garbage collection information using type information acquired from a type service. In order to provide appropriate garbage collection information, it is sufficient to validate that at every point where a garbage collection action could occur, the garbage collection information contains at least all the storage locations which track live references or memory pointers which can be displaced by the garbage collection action. This should be true during validation of the compiler-generated garbage collection information as well as during any reconstruction of the garbage collection information. In the description and in the claims, the term "storage location" should be interpreted broadly as including any location (volatile or non-volatile) that can hold information regarding the state of the program. Examples of storage locations include registers and stack slots.

Figure 3:
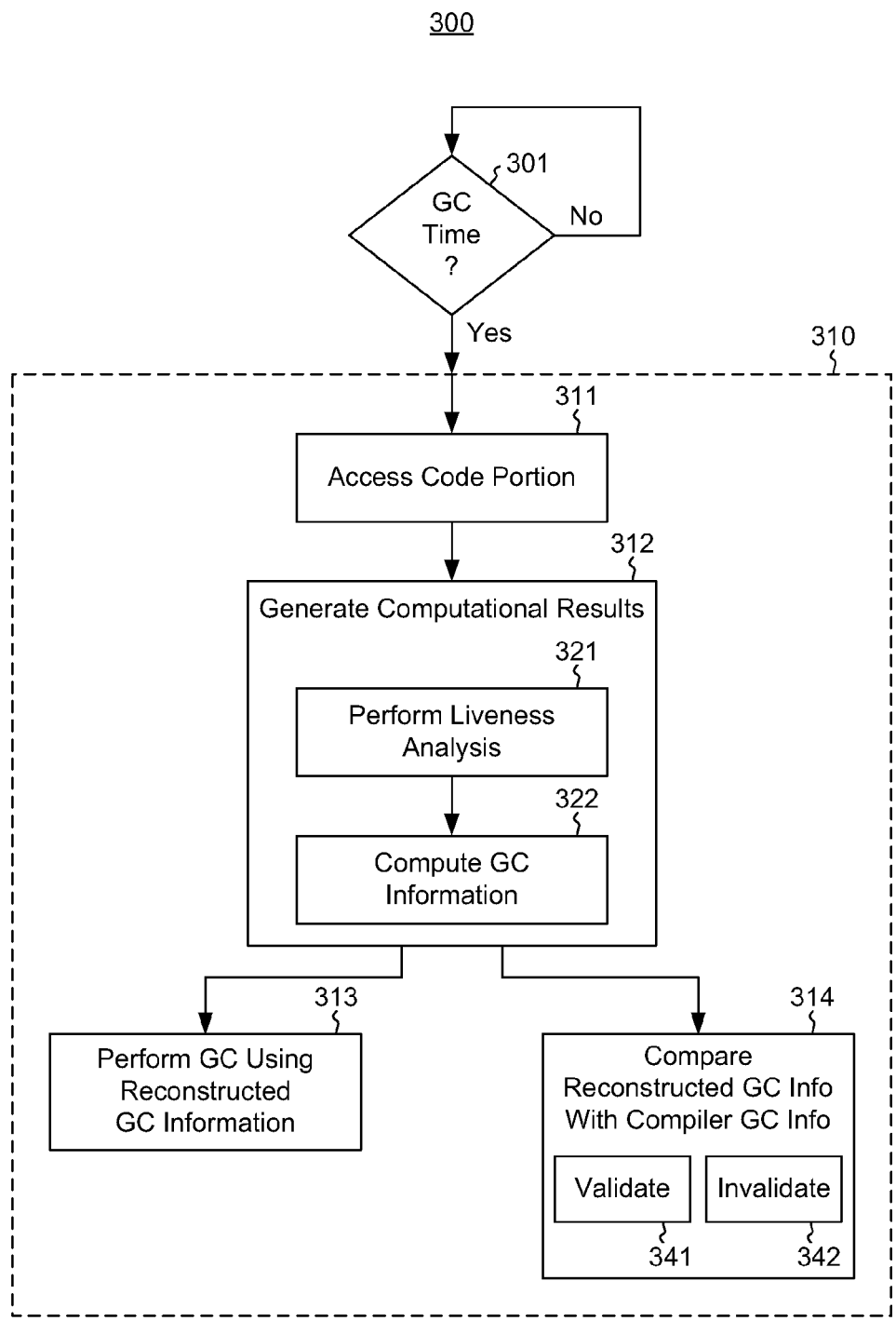
FIG. 3 illustrates a flowchart of a method for reconstructing garbage collection information using type information acquired from a type service.

While the reconstruction of the garbage collection information may be performed at any time before a garbage collection for the memory references takes place, FIG. 3 illustrates that the reconstruction of the garbage collection information may be performed once it is determined that a garbage collection action is imminent (Yes in decision block 301). If the reconstruction of garbage collection information is postponed until the actual time of the garbage collection action, the amount of memory used for the garbage collection may be significantly reduced.

In FIG. 3, box 310 includes actions that may be performed for each portion (e.g., each method or function) of the compiler-generated application code (e.g., assembly code). The reconstruction environment 230 first accesses a portion of compiler-generated application code (act 311). For instance, in FIG. 2, arrow 214 illustrates that analysis module 231 obtains compiler-generated assembly code. The reconstruction environment 230 then generates computational results that identify one or more storage locations which track live references or memory pointers which can be displaced during garbage collection (act 312). Generating such computational results allows the garbage collection action to know which storage locations may be moved during garbage collection.

In one embodiment, the generation of computational results is performed in two stages. First, an analysis module 231 performs a liveness analysis (act 321). Then, the computation module 232 performs the final computation of the storage locations (act 322) which track live references or memory pointers which can be displaced during garbage collection.

The analysis module 231 performs a liveness analysis (act 321) of the application code portion to generate liveness analysis results in the form of one or more live storage locations in the application code portion. A "live" storage location is a storage location that is live from the program perspective, but which may or may not contain memory storage location references. For example, it may contain integer values. This large collection of live locations is reduced to the subset containing only the live locations which contain references in the following computation phase. The analysis may use certain static values 234 in order to perform this liveness analysis as represented by arrow 244. As an example, the static values 234 may include signatures and return types of allocation method calls, and high level semantics of helper methods used by the compiler 210 to interact with the type service 220.

There may be multiple passes of standard data flow analysis that are performed on the assembly code to generate an initial set of live storage locations. A liveness analysis marks the possible storage locations which are live. In order to facilitate obtaining type information from the type service 220, constant propagation of data is also performed. Objects that are required to be not moved during a garbage collection (i.e., those marked as "pinned" in the compiler-generated code) are detected via a "pinning" propagation along the compiler-generated code. "Pinning" for memory references involves specifying that the garbage collector should not perform a displacement of the objects pointed to by these references. This information is obtained from the compiler. This pass is performed as a last pass just before comparison of the computed collection against the compiler generated garbage collection information in the case where the reconstructed garbage collection information is compared against the compiler-generated garbage collection information (as in act 314). The set of live storage locations is then passed to the computation module 232 (as represented by arrow 241).

The computation module 232 computes the computation results (act 322) using the liveness analysis results provided by the analysis module 231, and using type information acquired from a type service 220. The large collection of live locations received from the analysis module 231 is reduced in the comparison module 232 to the subset containing only the live locations which contain references. After this stage, the computational results identify one or more storage locations which track live references or memory pointers which can be displaced during garbage collection. In one embodiment, this set of one or more storage locations identified in the computational results is just a subset of one or more storage locations identified in compiler-generated garbage collection information generated by a compiler as a result of a compiler generating the application code portion.

After marking the live sets of registers and stack slots, the ones containing references are identified. Starting from the incoming argument types, possible reference locations are marked against any register and stack slot after inferring their types. The type service 220 is queried (see arrows 221 and 244) with class handles from the assembly code to get type information during allocation of objects. Based on semantics of helper methods, static field types and signatures of calls within the method (information acquired from the compiled information as represented by arrow 213), types in registers and stack locations are further inferred. This object reference information is propagated to reduce the live sets to contain only reference holding registers or stack slots. The set is further refined by performing a "pinning" propagation pass. The pinning information may also be obtained from the compilation process as also represented by arrow 213. These register/stack slot sets obtained against every assembly instruction offset now represent the collection that should be validated against the actual garbage collection information generated by the compiler or that should be provided to the garbage collector for performing a garbage collection.

The computation maintains a cache of types that specifies whether a type is a garbage collection reference and pointers to the type system metadata to infer further details (e.g. details of fields for a given offset, whether types are primitive types or value types). This cache is updated as the analysis gathers information regarding types on a per need basis.

Once the garbage collection information is reconstructed, the computing system may perhaps just use the garbage collection information results to perform garbage collection (act 313). Alternatively, the reconstructed garbage collection information may be compared against the compiler-generated garbage collection information (act 314). For instance, in FIG. 2, the computation module 232 provides the reconstructed set of storage locations (hereinafter also referred to as "reconstructed garbage collection information") that track live reference or memory pointers that can be displaced during garbage collection (represented by arrow 242). Likewise, the compiler also generates another more comprehensive set of storage locations (hereinafter also referred to as "compiler-generated garbage collection information") that track live reference or memory pointers that can be displaced during garbage collection. The process of the comparison module 233 acquiring the compiler-generated garbage collection information is represented by arrow 212.

The compiler-generated garbage collection information can be reduced to sets of registers and stack slots against every assembly offset. These sets are compared with the reconstructed garbage collection information to ensure that at every offset where a garbage collection is possible, the compiler generated sets are equal to, or a super set of, the reconstructed set. If the storage location(s) identified in the compiler-generated garbage collection information includes all of the storage location(s) identified in the computational results, the compiler-generated garbage collection information is validated (act 341). On the other hand, if the compiler-generated garbage collection information does not include one or more of the storage locations identified in the computational results, then the compiler-generated garbage collection information is invalidated (act 342). The output of the comparison operation is represented by arrow 243.

In the case of reconstruction of the garbage collection information, the reconstruction can be postponed until garbage collection is to occur at runtime. The type information provided by the type service may be leveraged to reconstruct the garbage collection information. Because the garbage collection information generation was postponed until used for actual garbage collection, the amount of garbage collection information used is much reduced compared to the amount of garbage collection information that would be generated by the compiler. Thus, memory is preserved while retaining the ability to perform garbage collection. The reconstructed garbage collection information may also be used to validate compiler-generated garbage collection information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more recordable-type storage devices excluding signals having stored thereon computer-executable instructions that are structured such that, when executed by one or more processors of a computing system, the computer-executable instructions cause the computing system to perform a method for reconstructing garbage collection information corresponding to an application, the method comprising:
at runtime of an application, accessing a portion of compiler-generated application code for the application;
at runtime of the application, performing a liveness analysis of the application code portion for live storage locations, to generate liveness analysis results in the form of one or more live program state storage locations in the application code portion;
at runtime of the application, computing computation results using the liveness analysis results and using type information from a type service, the computational results identifying one or more program state storage locations which track live references or memory pointers which can be displaced during garbage collection; and
at runtime of the application, comparing the computational results against garbage collection information generated by a compiler at a compile-time of the application and prior to the runtime of the application, the compiler-generated garbage collection information also identifying one or more program state storage locations which track live references or memory pointers and, subsequent to determining that the one or more storage locations identified in the compiler-generated garbage collection information includes all of the one or more program state storage locations which track live references or memory pointers and that are identified in the computational results, validating the compiler-generated garbage collection information and performing garbage collection.

2. The computer program product in accordance with claim 1, wherein when the compiler-generated garbage collection information does not include one or more of the at least one or more program state storage locations which track live references or memory pointers and that are identified in the computational results, then the method further comprises:
invalidating the compiler-generated garbage collection information.

3. The computer program product in accordance with claim 1, wherein the one or more program state storage locations which track live references or memory pointers and that are identified in the computational results is a subset of the one or more program state storage locations which track live references or memory pointers and that are identified in the compiler-generated garbage collection information.

4. The computer program product in accordance with claim 1, wherein the one or more program state storage locations which track live references or memory pointers and that are identified in the computational results is a subset of one or more program state storage locations which track live references or memory pointers and that are identified in compiler-generated garbage collection information generated by a compiler as a result of a compiler generating the application code portion.

5. The computer program product in accordance with claim 1, wherein the application code portion is intermediate code.

6. The computer program product in accordance with claim 1, wherein the application code portion is assembly code.

7. The computer program product in accordance with claim 1, the computer-executable instructions being further structured such that, when executed by the one or more processors, cause the computing system to perform the following:
determining that a garbage collection action is imminent on the application code portion; and
initiating the method of reconstructing garbage collection information in response to the act of determining that a garbage collection action is imminent.

8. The computer program product in accordance with claim 1, wherein the application code portion corresponds to a method or function of the application.

9. The computer program product in accordance with claim 1, wherein the method is repeated for each of multiple portions of the application.

10. The computer program product in accordance with claim 1, wherein computing uses pinning information from the application code portion so that program state storage locations which track live references or memory pointers and that are pinned are not included in the computational results.

11. A method for reconstructing garbage collection information corresponding to an application, the method performed by a computing system in response to executing computer-executable instructions by one or more processors of the computing system, the method comprising:
- at runtime of an application, the computing system determining that a garbage collection action is imminent on the application; and
- for each of a plurality of application code portions of the application, an act of the computing system performing the following at runtime:
  - accessing a portion of compiler-generated application code;
  - generating computational results that identify one or more program state storage locations which track live references or memory pointers which can be displaced during garbage collection; and
  - comparing the generated computational results against garbage collection information generated by a compiler at a compile-time of the application and prior to the runtime of the application, the compiler-generated garbage collection information also identifying one or more program state storage locations which track live references or memory pointers and, subsequent to determining that the one or more program state storage locations which track live references or memory pointers and that are identified in the compiler-generated garbage collection information includes all of the one or more program state storage locations which track live references or memory pointers and that are identified in the computational results, validating the compiler-generated garbage collection information.

12. The method in accordance with claim 11, further comprising the following for each of the plurality of application code portions:
- performing garbage collection using the generated computational results for at least one of the plurality of application code portions.

13. The method in accordance with claim 11, wherein generating computational results comprises the following for each of the plurality of application code portions:
- performing a liveness analysis of the application code portion to generate liveness analysis results in the form of one or more live program state storage locations in the application code portion; and
- computing the computation results using the liveness analysis results and using type information from a type service, the computational results identifying one or more program state storage locations which track live references or memory pointers which can be displaced during garbage collection.

14. The method in accordance with claim 11, wherein when the compiler-generated garbage collection information does not include one or more of the at least one or more program state storage locations which track live references or memory pointers and that are identified in the computational results, then the method further comprises:
- invalidating the compiler-generated garbage collection information.

15. The method in accordance with claim 11, wherein for at least one of the plurality of application code portions, generating computational results uses pinning information from the application code portion so that program state storage locations which track live references or memory pointers and that are pinned are not included in the generated computational results.

16. A computer system, comprising:
- one or more processors; and
- one or more computer storage media having stored thereon computer-executable instructions that are structured such that, when executed by the one or more processors of the computing system, cause the computing system to perform a method for reconstructing garbage collection information corresponding to an application, the method comprising:
  - at runtime of an application, determining that a garbage collection action is imminent on the application; and
  - for each of a plurality of application code portions of the application, performing the following at runtime:
    - performing a liveness analysis of the application code portion for live storage locations, to generate liveness analysis results in the form of one or more live program state storage locations in the application code portion;
    - computing computation results using the liveness analysis results, the computational results identifying one or more program state storage locations which track live references or memory pointers which can be displaced during garbage collection; and
    - comparing the generated computational results against garbage collection information generated by a compiler at a compile-time of the application and prior to the runtime of the application, the compiler-generated garbage collection information also identifying one or more program state storage locations which track live references or memory pointers and, subsequent to determining that the one or more program state storage locations which track live references or memory pointers and that are identified in the compiler-generated garbage collection information includes all of the one or more program state storage locations which track live references or memory pointers and that are identified in the computational results, validating the compiler-generated garbage collection information.

* * * * *